United States Patent
Gasperi et al.

(10) Patent No.: US 8,892,055 B2
(45) Date of Patent: *Nov. 18, 2014

(54) WIRELESS USER INTERFACE SYSTEM PERFORMANCE MONITORING

(71) Applicant: Rockwell Automation Technologies, Inc., Mayfield Heights, OH (US)

(72) Inventors: Michael L. Gasperi, Racine, WI (US); David D. Brandt, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,046

(22) Filed: Aug. 20, 2013

(65) Prior Publication Data

US 2013/0338798 A1 Dec. 19, 2013

Related U.S. Application Data (63) Continuation of application No. 12/782,937, filed on May 19, 2010, now Pat. No. 8,571,486.

(60) Provisional application No. 61/181,901, filed on May 28, 2009.

(51) Int. Cl.
*H04B 17/02* (2006.01)
*H04B 5/00* (2006.01)
*H02J 5/00* (2006.01)
*G05B 15/02* (2006.01)

(52) U.S. Cl.
CPC .............. *G05B 15/02* (2013.01); *H04B 5/0081* (2013.01); *H02J 5/005* (2013.01); *H04B 5/0037* (2013.01); *H04B 5/0031* (2013.01)

USPC ................ 455/67.7; 700/12; 700/22; 700/80; 326/16; 326/41; 307/104; 370/216

(58) Field of Classification Search
CPC .. H04B 5/0031; H04B 5/0037; H04B 5/0081; H04B 5/0093
USPC ........ 455/67.7, 41.1, 85, 88, 345, 557, 67.11; 326/41, 16; 370/216; 307/104
See application file for complete search history.

(56) References Cited

U.S. PATENT DOCUMENTS 3,718,828 A   2/1973   Britton et al.
5,253,564 A   10/1993  Rosenbrock et al.

(Continued)

OTHER PUBLICATIONS

Michael Catrysse, et al., "An Inductive Power System with Integrated Bi-directional Data-transmission," Sensors and Actuators, 2004, pp. 221-229, Elsevier, www.sciencedirect.com.

(Continued)

*Primary Examiner* — Marceau Milord (57) ABSTRACT

What is disclosed is a wireless push button device. The wireless push button device includes a user interface configured to receive user input to control a process of a machine system. The wireless push button device also includes a first transceiver coupled to the user interface and configured to wirelessly receive input power from a second transceiver, provide user power to the user interface, and wirelessly transfer communications related to the user input to the second transceiver. The wireless push button device also includes a processing system configured to determine when a power transfer problem exists between the second transceiver and the first transceiver, and transfer an alert in response to the power transfer problem.

20 Claims, 6 Drawing Sheets

(56) References Cited

U.S. PATENT DOCUMENTS

| | | | |
|---|---|---|---|
| 6,885,289 B1 | 4/2005 | Nakai | |
| 7,006,845 B2 | 2/2006 | Simon et al. | |
| 7,251,570 B2 | 7/2007 | Hancock et al. | |
| 7,315,236 B2 | 1/2008 | Yanagida et al. | |
| 7,355,506 B2 | 4/2008 | Chandley | |
| 7,518,489 B2 | 4/2009 | Nelson et al. | |
| 7,550,869 B2* | 6/2009 | Higuchi et al. | 307/10.5 |
| 7,912,597 B2 | 3/2011 | Yamada | |
| 7,961,092 B2 | 6/2011 | Freathy et al. | |
| 7,978,076 B2 | 7/2011 | Fast et al. | |
| 7,983,426 B2 | 7/2011 | Schuler et al. | |
| 8,138,898 B2* | 3/2012 | Jatschka et al. | 340/426.1 |
| 8,203,445 B2* | 6/2012 | Recker et al. | 340/531 |
| 8,244,234 B2 | 8/2012 | Zhu et al. | |
| 8,400,017 B2* | 3/2013 | Kurs et al. | 307/104 |
| 8,569,914 B2* | 10/2013 | Karalis et al. | 307/104 |
| 8,571,486 B2* | 10/2013 | Gasperi et al. | 455/67.7 |
| 2006/0265231 A1 | 11/2006 | Fusaro et al. | |
| 2007/0013545 A1 | 1/2007 | Tippelt | |
| 2007/0080783 A1 | 4/2007 | Ghosh et al. | |
| 2007/0158441 A1 | 7/2007 | Briole et al. | |
| 2007/0200778 A1 | 8/2007 | Henty | |
| 2008/0007408 A1 | 1/2008 | Hwang et al. | |
| 2008/0186178 A1 | 8/2008 | Tuttle et al. | |
| 2009/0167496 A1 | 7/2009 | Norman | |
| 2010/0057296 A1 | 3/2010 | Ryman | |
| 2010/0079289 A1 | 4/2010 | Brandt et al. | |
| 2010/0097186 A1* | 4/2010 | Wielebski et al. | 340/10.1 |
| 2010/0304683 A1 | 12/2010 | Gasperi | |

OTHER PUBLICATIONS

Franklin Hadley, "Goodbye Wires . . . MIT Team Experimentally Demonstrates Wireless Power Transfer, Potentially Useful for Powering Laptops, Cell Phones, Without Cords," MIT News, Jun. 7, 2007, 3 pages, MIT News Office, Cambridge, Massachusetts.

John Markoff, "Intel Moves to Free Gadgets of Their Recharging Cords," The New York Times, Aug. 20, 2008, 5 pages, The New York Times, New York, New York.

Tsuyoshi Sekitani, et al., "A Large-area Wireless Power-transmission Sheet Using Printed Organic Transistors and Plastic MEMS Switches," Nature Materials, Jun. 2007, pp. 413-417, vol. 6, Nature Publishing Group.

Makoto Takamiya, et al., "Design Solutions for a Multi-object Wireless Power Transmission Sheet Based on Plastic Switches," IEEE International Solid-state Circuits Conference, Feb. 13, 2007, pp. 362-363 and 609, Session 20, IEEE.

Glenn Vandevoorde, et al., "Wireless Energy Transfer for Stand-alone Systems: A Comparison Between Low and High Power Applicability," Sensors and Actuators, 2001, pp. 305-311, Elsevier.

* cited by examiner

WIRELESS USER INTERFACE SYSTEM PERFORMANCE MONITORING

RELATED APPLICATIONS

This application is a continuation of, and claims priority to, U.S. patent application Ser. No. 12/782,937, filed on May 19, 2010, entitled "WIRELESS USER INTERFACE SYSTEM PERFORMANCE MONITORING." This application is also related to and claims priority to U.S. Provisional Patent Application 61/181,901, titled "WIRELESS OPERATOR BUTTON," filed on May 28, 2009, and which is hereby incorporated by reference in its entirety.

TECHNICAL FIELD

Aspects of the disclosure are related to the field of industrial and automation controls, and in particular, to user interface devices for control of operations of machine systems.

TECHNICAL BACKGROUND

Industrial and automation control panels typically include electrical switches, pushbuttons, indicator lamps, selector switches, or other user interface devices, disposed on metal plates or enclosure doors. The user interface devices can be human-interface devices for an operator to control and monitor the operations and processes of machine systems.

In typical installations, these user interface devices are inserted through holes in the control panels and secured with threaded rings. The user interface devices are then connected via discrete wires and screw terminals to the associated machine systems, with many user interface devices typically arrayed on a control panel. However, using discrete wires and screw terminals presents challenges in the assembly, testing, installation, and maintenance of these control panels. Opportunities for mis-wiring, improper placement of user interface devices within the control panel assembly, failure of wires in high-vibration environments, among other problems, present substantial issues in the use of industrial and automation control panels for controlling the operations and processes of machine systems.

OVERVIEW

What is disclosed is a wireless push button device. The wireless push button device includes a user interface configured to receive user input to control a process of a machine system. The wireless push button device also includes a first transceiver coupled to the user interface and configured to wirelessly receive input power from a second transceiver, provide user power to the user interface, and wirelessly transfer communications related to the user input to the second transceiver. The wireless push button device also includes a processing system configured to determine when a power transfer problem exists between the second transceiver and the first transceiver, and transfer an alert in response to the power transfer problem.

What is also disclosed is a method for operating a wireless push button device. The method includes, in a user interface, receiving user input to control a process of a machine system. The method also includes, in a first transceiver coupled to the user interface, wirelessly receiving input power from a second transceiver, providing user power to the user interface, and wirelessly transferring communications related to the user input to the second transceiver. The method also includes, in a processing system, determining when a power transfer problem exists between the second transceiver and the first transceiver, and transferring an alert in response to the power transfer problem.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
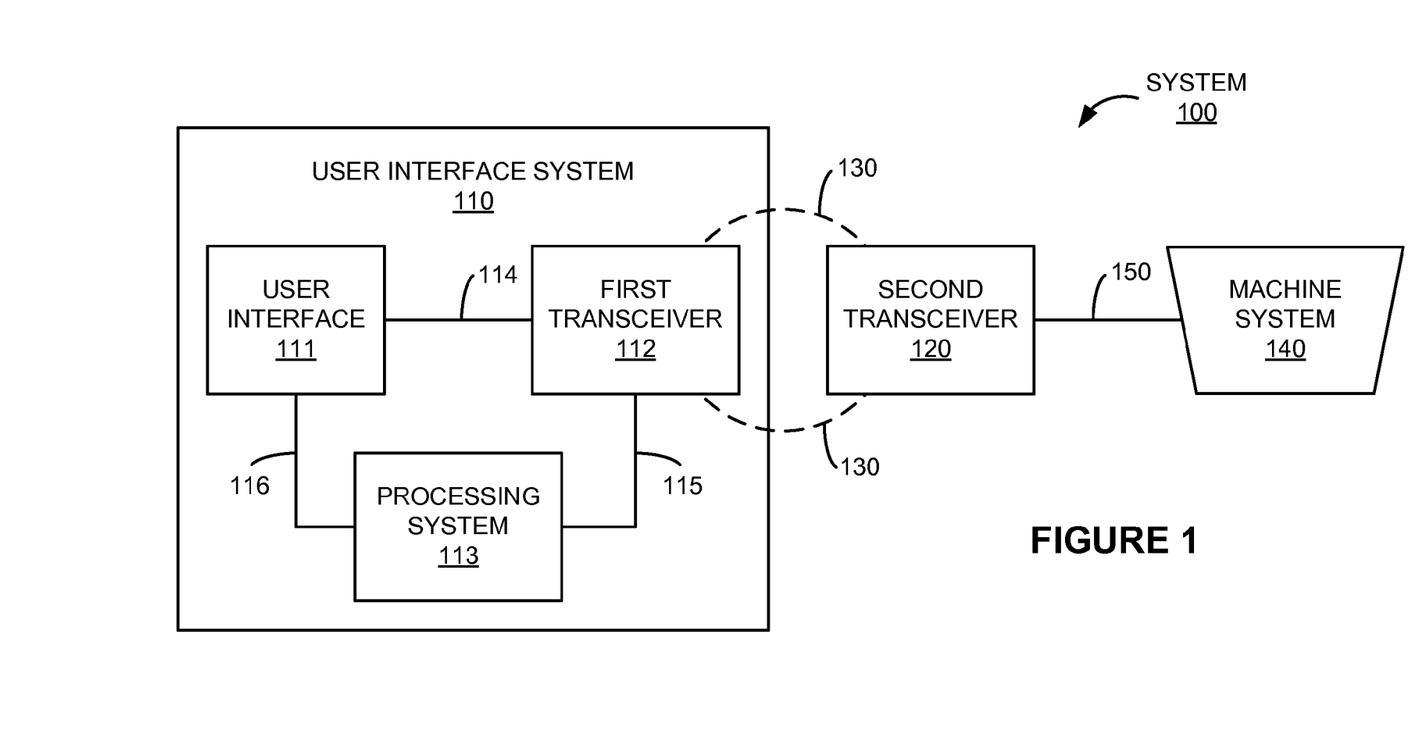
FIG. 1 is a system diagram illustrating a user interface system.

FIG. 1 is a system diagram illustrating system 100 for controlling a process, where the process is implemented by machine system 140. System 100 includes user interface system 110, second transceiver 120, and machine system 140. User interface system 110 includes user interface 111, first transceiver 112, and processing system 113. First transceiver 112 and user interface 111 communicate over link 114. First transceiver 112 and processing system 113 communicate over link 115. User interface 111 and processing system 113 communicate over link 116. First transceiver 112 of user interface system 110 and second transceiver 112 are coupled by wireless link 130. Second transceiver and machine system 113 communicate over link 150.

User interface 111 includes equipment and circuitry for receiving user input and control. Examples of user interface 111 include push buttons, selection knobs, dials, switches, actuators, keys, keyboards, pointer devices, touchscreens, microphones, transducers, potentiometers, non-contact sensing circuitry, or other human-interface equipment. In some examples, user interface 111 also includes equipment to communicate information to a user or an operator of user interface system 110. Examples of the equipment to communicate information to the operator could include indicator lights, lamps, light-emitting diodes, displays, haptic feedback devices, audible signal transducers, speakers, buzzers, alarms, or other indicator equipment, including combinations thereof.

First transceiver 112 includes circuitry to induce an electromagnetic field in the air, space, or material environment of first transceiver 112. First transceiver 112 also includes circuitry to detect and receive electromagnetic fields from the air, space, or material environment of first transceiver 112. Examples of first transceiver 112 include transformers, transformer windings, electrically conductive coils, amplifiers, power coupling circuitry, communication equipment, printed circuit boards, or other circuitry and materials, including combinations thereof. In some examples, first transceiver 112 is tuned to be sensitive to near-field electromagnetic fields.

Processing system 113 comprises specialized circuitry or a microprocessor to monitor performance factors of first transceiver 112, determine when a power transfer problem exists between second transceiver 120 and first transceiver 112, and transfer an alert in response to the power transfer problem. In further examples, processing system 113 receives user input information from user interface 111 and transfers the user input information to first transceiver 112. Processing system 113 could modify or alter the user input information. In some examples, processing system 113 is located within the same equipment or circuitry in which first transceiver 112 or user interface 111 are located. Processing system 113 could also comprise software to direct processing system 113 to operate as described herein when executed. The software could be stored on a storage system which could include a computer-readable medium such as a disk, tape, integrated circuit, server, or some other memory device, and also may be distributed among multiple memory devices. The software may include an operating system, logs, utilities, drivers, networking software, and other software typically loaded onto a computer system. The software could also contain an application program, firmware, or some other form of computer-readable processing instructions.

Second transceiver 120 includes circuitry to induce an electromagnetic field in the air, space, or material environment of second transceiver 120. Second transceiver 120 also includes circuitry to detect and receive electromagnetic fields from the air, space, or material environment of second transceiver 120. Examples of second transceiver 120 include transformers, transformer windings, electrically conductive coils, amplifiers, power coupling circuitry, communication equipment, printed circuit boards, or other circuitry and materials, including combinations thereof. Second transceiver 120 could be of a similar configuration as first transceiver 112, or could be of a different configuration, size, or shape. In some examples, second transceiver 120 is tuned to be sensitive to near-field electromagnetic fields.

First transceiver 112 and second transceiver 120 do not share a transformer core in many examples of system 100. A transformer core is typically a magnetically permeable material used to channel, confine, or contain magnetic fields to the transformer core. However, in the example shown in system 100, a transformer core is not employed.

Also, in further examples, second transceiver 120 could include a primary coil or winding of a transformer, whereas first transceiver 112 could include a secondary coil or winding of the transformer. In many examples where second transceiver 120 and first transceiver 112 include primary and secondary coils or windings of a transformer, the coils or windings contained therein are not coupled by a transformer core, and removably separate from each other. It should be understood that the notation of primary and secondary could be interchanged.

Machine system 140 includes an operation or process implemented by a machine system. Examples of machine system 140 include various functions of machinery, manufacturing equipment, assembly equipment, milling equipment, presses, hydraulic equipment, vehicles, or other machine systems, including combinations thereof. Further examples of a process include a lathe machine speed control, a roller mechanism engagement button, an on/off function of a manufacturing device, a lift function for a forklift, among other examples.

Wireless link 130 uses various communication media, such as air, space, or some other wireless transport media—including combinations thereof. Wireless link 130 could include an electromagnetic link between first transceiver 112 and second transceiver 120. In some examples, wireless link 130 includes an electromagnetic field induced by first transceiver 112 in the surroundings of first transceiver 112. Second transceiver 120 could detect and receive the electromagnetic field energy induced by first transceiver 112. In other examples, wireless link 130 includes an electromagnetic field induced by second transceiver 120 in the surroundings of second transceiver 120. First transceiver 112 could detect and receive the electromagnetic field energy induced by second transceiver 120. In many examples, first transceiver 112 and second transceiver 120 are located in close proximity to each other to advantageously receive a larger portion of the electromagnetic energy induced to form wireless link 130.

In some examples, wireless link 130 is a near-field electromagnetic link. In examples of a near-field electromagnetic link, the link utilizes localized electromagnetic field energy coupled to other elements in a system by a resonance mechanism. The electromagnetic field energy produced by one device can couple using the near field to induce a current in another device located within a close distance. The near field is in contrast to examples of a far-field link in which the link distance is greater and relies upon electromagnetic energy radiated into space, typically through the use of an antenna, to establish a link. A near-field electromagnetic link, in typical examples, has a link distance smaller than the wavelength of the electromagnetic energy transferred across the electromagnetic link, and is in contrast to examples of a far-field electromagnetic link in which the link distance is greater than the wavelength of the electromagnetic energy transferred.

Wireless link 130 may comprise many different signals sharing the same link. Wireless link 130 could include multiple signals operating in a single "path"—as represented by the dashed lines in FIG. 1—comprising multiple frequencies, channels, directional links, logical transportation links, or communication directions. For example, communications and control signals between first transceiver 112 and second transceiver 120 could share the same wireless link 130, but be transferred over different frequencies, channels, directional links, logical transportation links, or communication directions—including combinations thereof. Additionally, wireless link 130 may comprise a direct or modulated transfer of energy from either of first transceiver 112 and second transceiver 120 to one another. In some examples, this transfer of energy could occur concurrently with other communication signaling across link wireless 130.

Links 114-116 each comprise a physical, logical, or virtual communication and power link, capable of carrying power and communicating data, control signals, and communications, along with other information. In some examples, links 114-116 are encapsulated within the elements of user interface 111, first transceiver 112, or processing system 113, and the communication portion may be a software or logical link. In other examples, links 114-116 each use various communication media, such as air, space, metal, optical fiber, or some other signal propagation path, including combinations thereof. Links 114-116 could each be a direct link or might include various equipment, intermediate components, systems, and networks.

Link 150 uses various communication media, such as air, space, metal, optical fiber, or some other signal propagation path—including combinations thereof. Link 150 could be wired or wireless and could use communication interfaces such as DeviceLogix, radio-frequency identification (RFID), controller-area network (CAN), wireless fidelity (WiFi), infrared data association (IrDA), or other communication interfaces—including combinations, improvements, or variations thereof. Link 150 could be a direct link or might include various equipment, intermediate components, systems, and networks. In some examples, link 150 includes multiple signals operating in a single pathway in a similar manner as link 130.

Figure 2:
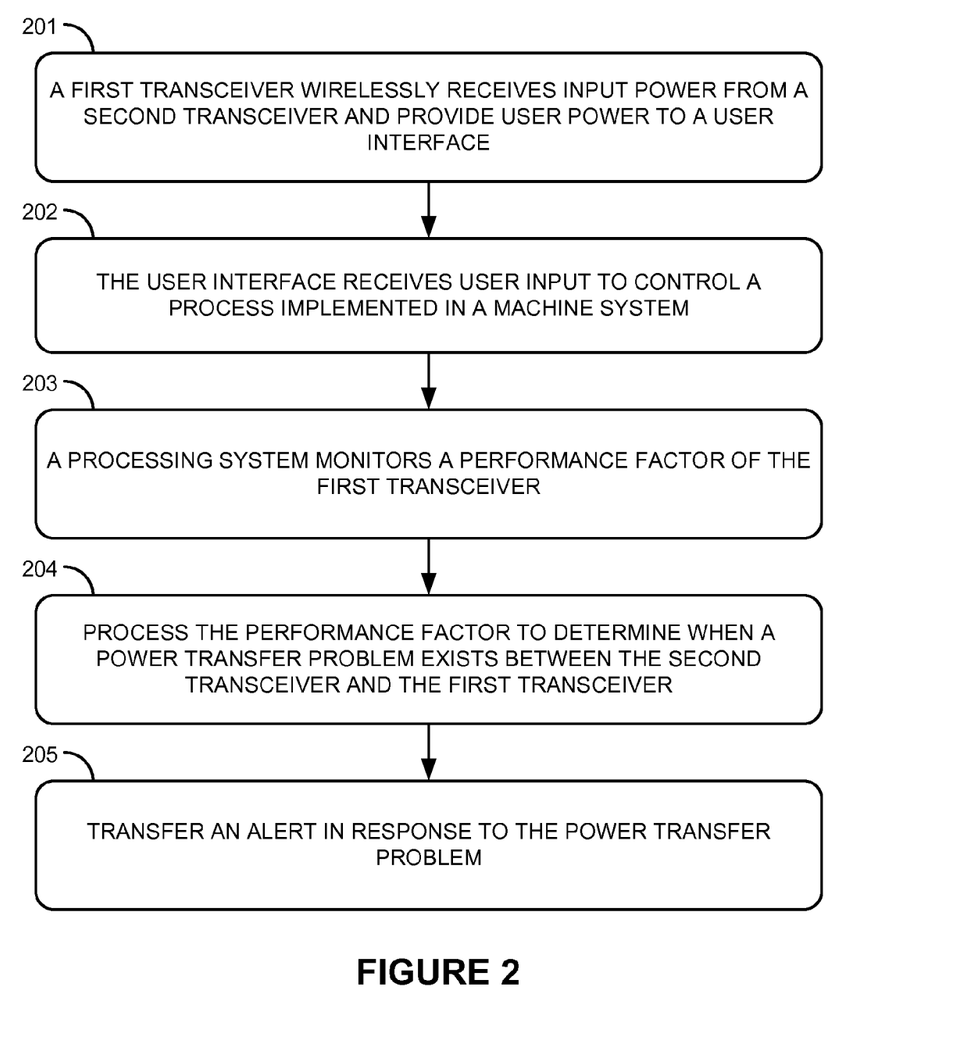
FIG. 2 is a flow diagram illustrating a method of operation of a user interface system.

FIG. 2 is a flow diagram illustrating a method of operation of system 100 for controlling a process that is implemented by a machine system, as found in FIG. 1. The operations shown in FIG. 2 are referenced herein parenthetically. In FIG. 2, first transceiver 112 wirelessly receives (201) input power from second transceiver 120, and first transceiver 112 provides (201) user power to user interface 111. In this example, the input power is received over wireless link 130, and the user power is provided over link 114. In further examples, processing system 113 also receives power over link 115 or 116. In many examples, second transceiver 120 creates a near-field electromagnetic field in the space and materials surrounding second transceiver 120. This near-field electromagnetic field induces a current in first transceiver 112, and can be used to transfer the input power from second transceiver 120 to first transceiver 112 over wireless link 130. Also, in some examples, first transceiver 112 could modify, convert, or otherwise alter the input power to derive the user power.

User interface 111 receives (202) user input to control a process implemented in machine system 140. The user input could result from a user interacting with user interface 111. For example, if user interface 111 includes a push button, the user input could reflect the state of the push button, among other information. In other examples, user interface 111 includes a rotary control, and the user input could include information related to the position of the rotary control.

Processing system 113 monitors (203) a performance factor of first transceiver 112. The performance factor could include performance information related to power transfer over the wireless link between second transceiver 120 and first transceiver 112, or the input power received by first transceiver 112. For example, the performance factor could include electrical parameters such as a voltage or current associated with the input power received in first transceiver 112. The performance factor could also include positional parameters, such as a change in a positional relationship between the first transceiver and the second transceiver, such as an angular orientation or a spacing.

Processing system 113 processes (204) the performance factor to determine when a power transfer problem exists between second transceiver 120 and first transceiver 112. The power transfer problem could indicate where transfer of the input power from second transceiver 120 to first transceiver 112 is degraded, where increased losses exist, or other problems in the transfer of power between second transceiver 120 and first transceiver 112. Processing system 113 processes the performance factor, which could include, as discussed herein, electrical parameters, positional parameters, or other information related to power transfer, to determine when the performance factor degrades sufficiently to indicate a power transfer problem exists. For example, a threshold could be employed to determine when a power transfer problem exists. When the threshold is crossed, such as when a voltage associated with the input power decreases below a threshold voltage, processing system 113 could determine that a power transfer problem exists.

Processing system 113 transfers (205) an alert in response to the power transfer problem. In some examples, processing system 113 transfers the alert to first transceiver 112, where first transceiver 112 then wirelessly transfers the alert to second transceiver 120. In other examples, processing system 113 transfers the alert to user interface 111, and user interface 111 indicates the alert to a user of user interface system 110, such as by illuminating an indicator light in response to the alert.

In further examples, first transceiver 112 transfers communications over wireless link 130. In many examples, first transceiver 112 creates a near-field electromagnetic field in the space and materials surrounding first transceiver 112. The near-field electromagnetic field could be modulated to transfer the user input received from user interface 111, information related to alerts or performance factors, or other information. Second transceiver 120 receives the communications from first transceiver 112 over wireless link 130. In some examples, a near-field electromagnetic field produced by first transceiver 112 induces a corresponding current in second transceiver 120, and can be used to transfer communications from first transceiver 112 to second transceiver 120 over wireless link 130. Second transceiver 120 then transfers the communications to control a process implemented by machine system 140. Machine system 140 could then implement the communications to enact a physical action in some form of machinery, engage a mechanism, move an actuator, or other response, including both physical and logical actions. It should be understood that the communications transferred over wireless link 130 could be of a different form than that transferred from user interface 111 or to machine system 140. For example, a first communication protocol could be used to transfer communications from user interface 110, a second communication protocol employed over wireless link 130, and a third communication protocol employed over link 150. Various modulation techniques or communication protocols could be employed over wireless link 130.

It should be understood that although the term 'process' is used herein to describe what is implemented in or controlled by a machine system, it should be understood that the term 'process' could also refer to an operation, phase, or other action implemented in or controlled by a machine system.

Figure 3:
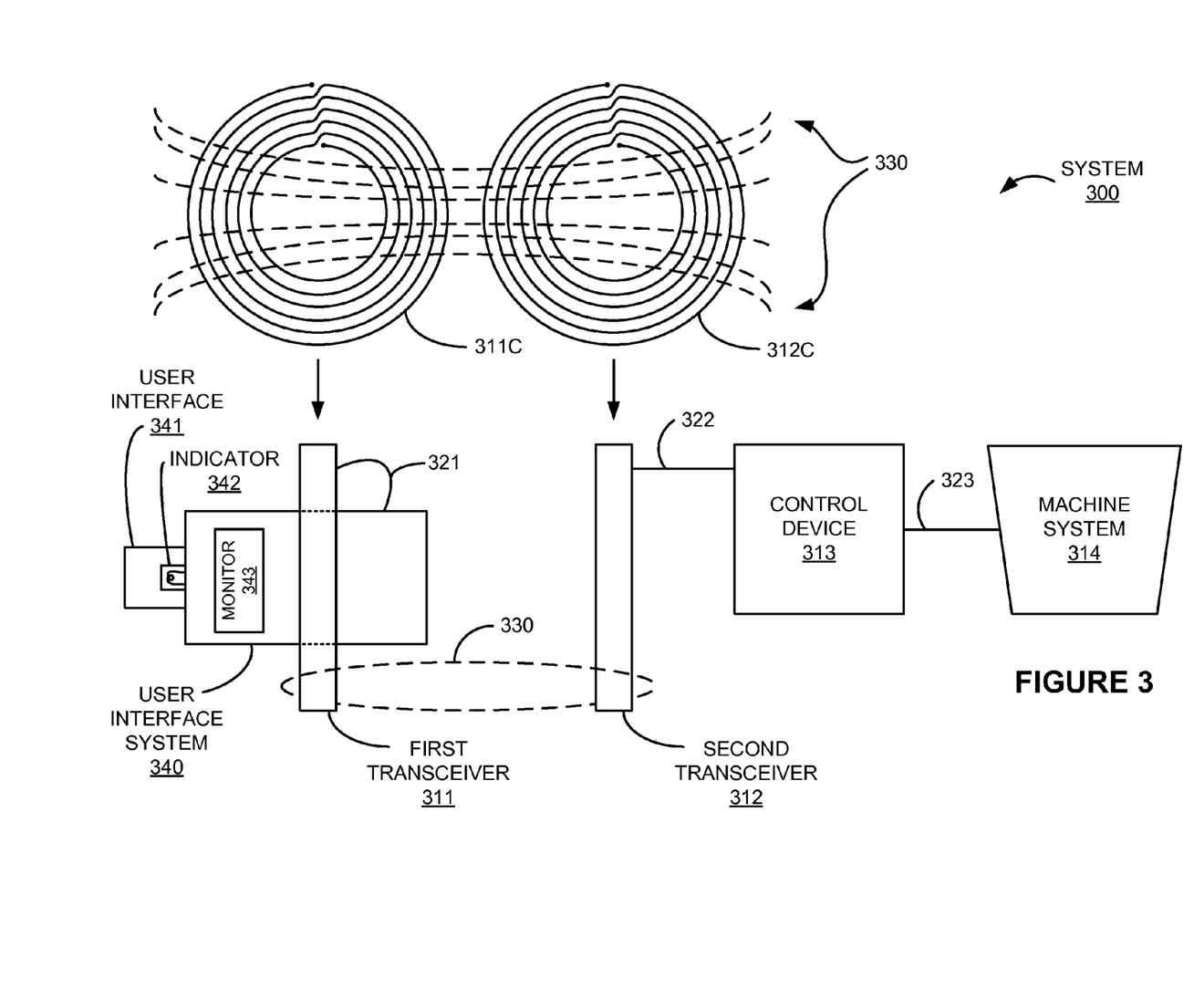
FIG. 3 is a system diagram illustrating a user interface system.

FIG. 3 is a system diagram illustrating system 300 for controlling a process, where the process is implemented by a machine system. System 300 includes user interface system 340, first transceiver 311, second transceiver 312, control device 313, and machine system 314. User interface system 340 includes user interface 341, indicator 342, and monitor 343. User interface system 340 and first transceiver 311 communicate over link 321, and user interface system 340 receives power from first transceiver 311 over link 321, although separate power and communication links could be employed. First transceiver 311 and second transceiver 312 communicate over wireless link 330. Second transceiver 312 and control device 313 communicate over link 322. Control device 313 and machine system 314 communicate over link 323.

User interface system 340 includes equipment, circuitry, or mechanisms for receiving user input and control, as well as equipment, circuitry, or mechanisms for indicating a state of the process implemented in a machine system to a user, among other functions. User interface system 340 includes user interface 341, which in this example includes a lighted pushbutton, although in other examples, user interface system 340 could include other equipment. User interface 341 also includes indicator 342. In this example, indicator 342 includes a visible light, such as an incandescent lamp or a light-emitting diode. In some examples, indicator 342 is mounted internally to a push button of user interface 341, with the push button of user interface 341 being made of a material sufficiently translucent to pass light emitted by indicator 342.

Also in this example, user interface system 340 includes monitor 343. Monitor 343 receives the user input information from user interface 341 and transfers the user input information to first transceiver 311 over link 321 for delivery over wireless link 330. In other examples, monitor 343 receives information related to the state of machine system 314 from first transceiver 311 and transfers the information to user interface 341. Monitor 343 could filter, modify, or alter the user input information or machine state information before further transfer. Also, in typical examples, monitor 343 is configured to receive operating power from first transceiver 311 or other circuitry in user interface system 340. Monitor 343 also monitors performance of power transfer and communication exchange over wireless link 330 or link 321. Monitor 343 could include equipment and systems as described for processing system 113, although other configurations could be employed. It should be understood that the power transfer over wireless link 330 could include alternating or modulated magnetic fields or currents, and the monitored electrical parameters such as voltages or currents, could be related to the alternating or modulated performance of the power transfer. For example, a root-mean-square (RMS), average, phase angle, DC-component, frequency spectrum, or other metrics of the voltage, current, or power could be monitored.

First transceiver 311 includes circuitry to induce a magnetic field in the air, space, or material environment of first transceiver 311. First transceiver 311 also includes circuitry to detect and receive magnetic fields from the air, space, or material environment of first transceiver 311. In this example, first transceiver 311 includes an electrically conductive coil, as illustrated by the front-view of the circular shapes of coil 311C in FIG. 3. Also in this example, first transceiver 311 is tuned to be sensitive to near-field magnetic fields. In some examples, coil 311C could be formed as a printed circuit on a printed circuit board (PCB) assembly, and could further include several electrically connected coils on different layers of a PCB. In other examples, coil 311C could include wire wrapped around a central spindle.

Second transceiver 312 includes circuitry to induce a magnetic field in the air, space, or material environment of second transceiver 312. Second transceiver 312 also includes circuitry to detect and receive magnetic fields from the air, space, or material environment of second transceiver 312. In this example, second transceiver 312 includes an electrically conductive coil, as illustrated by the front-view of the circular shapes of coil 312C in FIG. 3. Also in this example, second transceiver 312 is tuned to be sensitive to near-field magnetic fields. In some examples, coil 312C could be formed as a printed circuit on a printed circuit board (PCB) assembly, and could further include several electrically connected coils on different layers of a PCB. In other examples, coil 312C could include wire wrapped around a central spindle.

Although spiral-shaped coils, as shown via front-view in FIG. 3, are included in this example of first transceiver 311 and second transceiver 312, it should be understood that the coils could be of other configurations, a different geometry, or a different number of turns, as determined to suit the communications, power transfer, or efficiency desires of system 300, or by other factors, including combinations thereof. For example, the coils could be formed by a series of open concentric shapes, where the ends of the open concentric shapes are electrically connected in a series fashion. In this example, it should be noted that although coils 311C of first transceiver 311 are shown as a similar size, shape, and number of turns as that of coils 312C of second transceiver 312, other examples could include coils of a different size, shape, or number of turns.

In further examples of first transceiver 311 and second transceiver 312 other equipment and circuitry could be included. For instance, circuitry such as capacitors, inductors, resistors, or active components could be employed to establish a frequency resonance, sensitivity, or proper operation of first transceiver 311 and second transceiver 312 based on the coil shapes, number of turns, or other factors. Additionally, in typical examples, first transceiver 311 and second transceiver 312 include circuitry to facilitate communications and power transfer across link 330.

Also, in further examples, coil 312C of second transceiver 312 could be a primary coil or winding of a transformer, where coil 311C of first transceiver 311 could be a secondary coil or winding of the transformer. In many examples where coil 312C and coil 311C are primary and secondary coils or windings of a transformer, coil 312C and coil 311C are not coupled by a transformer core, and removably separate from each other. It should be understood that the notation of primary and secondary could be interchanged.

As shown in the example in FIG. 3, user interface system 340 is disposed inside first transceiver 311 by being mounted internally to and longitudinally along the axis of first transceiver 311. User interface system 340 passes through the middle portion of coil 311C of first transceiver 311, so that first transceiver 311 could be mounted to surround user interface system 340. Also, coil 311C of first transceiver 311 and coil 312C of second transceiver 312 are not formed on the same assembly in this example.

Advantageously, mounting user interface system 340 internally to first transceiver 311 could allow for compact mounting of an assembly incorporating both user interface system 340 and first transceiver 311 to a control panel, cabinet, or other mounting structure. In some examples, first transceiver 311 takes the place of a spacer, gasket, or seal normally used when mounting user interface system 340 to a control panel. Additionally, an assembly which includes both user interface system 340 and first transceiver 311 could be removably mounted to another assembly, such as a control panel, incorporating second transceiver 312 to allow for close proximity of first transceiver 311 and second transceiver 312. In many examples, an assembly incorporating both user interface system 340 and first transceiver 311 could be further disposed inside second transceiver 312, being mounted internally to and longitudinally along the central axis of second transceiver 312, with first transceiver 311 and second transceiver 312 arranged in close proximity.

In examples where first transceiver 311 and second transceiver 312 are each formed on separate, generally flat, PCB assemblies, both transceivers could be mounted with the generally flat surfaces of each PCB assembly in close proximity, and user interface system 340 mounted internally to, and longitudinally along, the axis of the combined first transceiver 311 and second transceiver 312, thereby being disposed inside first transceiver 311 and second transceiver 312. Advantageously, if user interface system 340 and first transceiver 311 are mounted together as an assembly, quick insertion and removal of the assembly of user interface system 340 and first transceiver 311 from second transceiver 312 could be achieved without the need to connect or disconnect a wired interface. During assembly and maintenance, in this example of user interface system 340 and first transceiver 311 mounted as an assembly into a control panel which incorporates second transceiver 312, the removal or insertion of the user interface system 340 and first transceiver 311 assembly can be greatly eased without the need to connect or disconnect a wired interface.

Control device 313 includes equipment and circuitry to transfer power to second transceiver 312 over link 322, as well as exchange communication with second transceiver 312 over link 322. Control device 313 can also receive alerts over link 322, as received by second transceiver 312, and indicate the alert to an operator of user interface system 340 or machine system 314. Examples of control device 313 include amplifiers, filters, switches, solid-state electronics, microprocessors, antennas, or other circuitry. In further examples, control device 313 transfers control information to machine system 314 over link 323, and could receive information related to the state of the process implemented by the machine system in machine system 314 over link 323. Control device 313 could communicate with further systems and equipment over communication interfaces such as DeviceLogix, radio-frequency identification (RFID), controller-area network (CAN), wireless fidelity (WiFi), infrared data association (IrDA), or other communication interfaces—including combinations, improvements, or variations thereof.

Machine system 314 includes a process implemented by a machine system. Examples of machine system 314 include various functions of machinery, manufacturing equipment, assembly equipment, milling equipment, presses, hydraulic equipment, vehicles, or other machine systems, including combinations thereof.

Wireless link 330 is shown in FIG. 3 as being comprised of magnetic field lines, as illustrated by the dashed lines passing through the coils of first transceiver 311 and second transceiver 312. Wireless link 330 uses various communication media, such as air, space, material, or some other wireless transport media—including combinations thereof. Wireless link 330 could include a magnetic link, electromagnetic link, electrostatic link, or other link, between first transceiver 311 and second transceiver 312. In this example, wireless link 330 includes a magnetic field induced by coil 311C of first transceiver 311 in the surroundings of first transceiver 311. Second transceiver 312 could detect and receive the magnetic field energy induced by first transceiver 311. Wireless link 330 also includes a magnetic field induced by coil 312C of second transceiver 312 in the surroundings of second transceiver 312. First transceiver 311 could detect and receive the magnetic field energy induced by second transceiver 312.

In many examples, first transceiver 311 and second transceiver 312 are located in close proximity to each other to advantageously receive a larger portion of the magnetic energy induced to form wireless link 330. In this example, wireless link 330 is a near-field magnetic link. It should be understood that the magnetic field lines illustrated by the dashed lines in wireless link 330 of FIG. 3 are merely representative of wireless link 330 to show magnetic fields generated by one coil are able to be received at another coil.

In examples of a near-field magnetic link, the link uses localized magnetic field energy coupled to other elements in a system by a resonance mechanism. The magnetic field energy produced by one device can couple using the near field to induce a current in another device located within a close distance. Advantageously, when first transceiver 311 and second transceiver 312 are located within close proximity, and with coils 311C and 312C generally aligned, the near-field magnetic link could transfer a higher level of power or energy between first transceiver 311 and second transceiver 312. This is in contrast to a far-field electromagnetic link which has difficulty with power transfer, as energy transfer efficiency and coupling reduces sharply as the separation distance or spacing increases.

Wireless link 330 may comprise many different signals sharing the same link. Wireless link 330 could include multiple signals operating in a single "path"—as represented by the dashed lines in FIG. 3—comprising multiple frequencies, channels, directional links, logical transportation links, or communication directions. For example, communications and control signals between first transceiver 311 and second transceiver 312 could share the same wireless link 330, but be transferred over different frequencies, channels, directional links, logical transportation links, or communication directions—including combinations thereof. Additionally, wireless link 330 may comprise a direct or modulated transfer of energy from either of first transceiver 311 and second transceiver 312 to one another. In some examples, this transfer of energy occurs concurrently with other communication signaling across link wireless 330.

Links 321-323 use various communication media, such as air, space, metal, optical fiber, or some other signal propagation path—including combinations thereof. Links 321-323 could be wired or wireless and could use communication interfaces such as DeviceLogix, radio-frequency identification (RFID), controller-area network (CAN), wireless fidelity (WiFi), infrared data association (IrDA), or other communication interfaces—including combinations, improvements, or variations thereof. Links 321-323 could be direct links or might include various equipment, intermediate components, systems, and networks. In some examples, links 321-323 include multiple signals operating in a single pathway in a similar manner as link 330.

Figure 4:
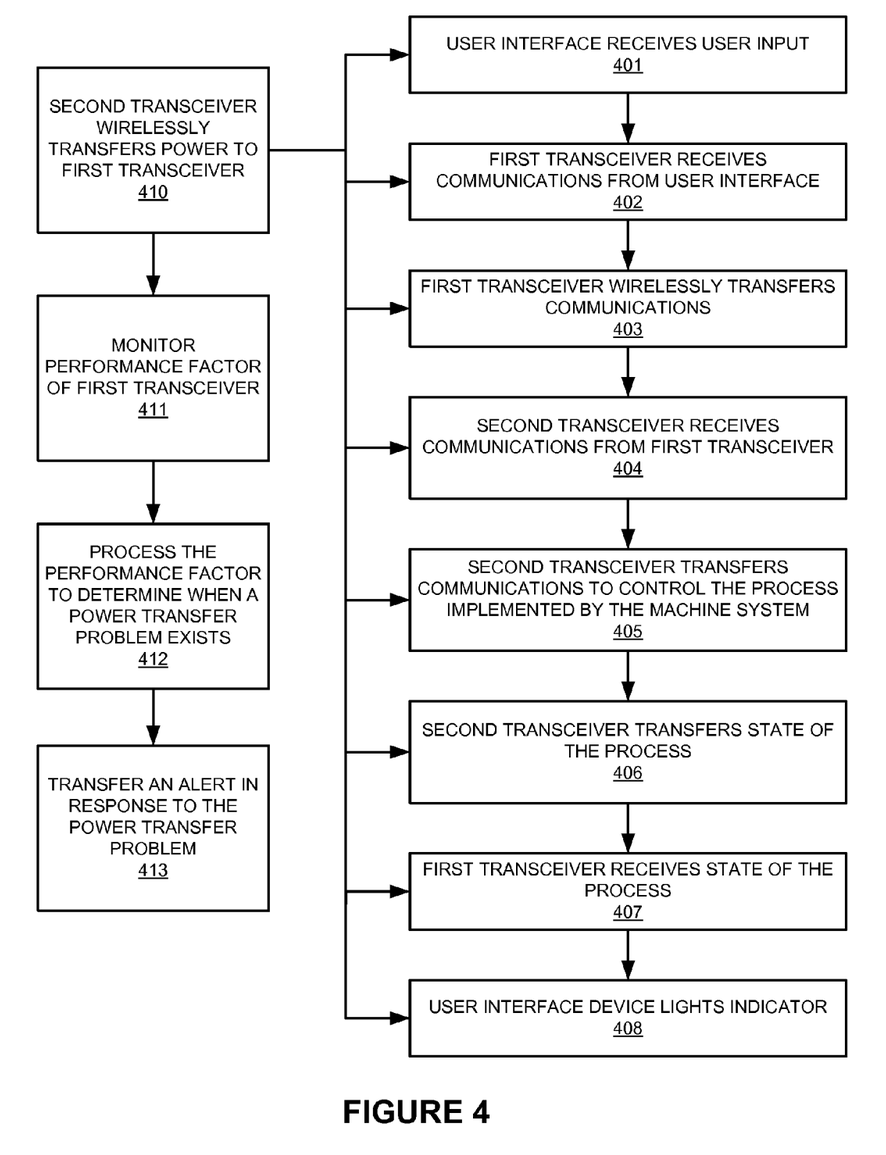
FIG. 4 is a flow diagram illustrating a method of operation of a user interface system.

FIG. 4 is a flow diagram illustrating a method of operation of system 300 for controlling a process that is implemented by machine system 314, as found in FIG. 3. The operations shown in FIG. 4 are referenced herein parenthetically. In FIG. 4, second transceiver 312 wirelessly transfers (410) power to first transceiver 311 over wireless link 330. In this example, second transceiver 312 creates a near-field magnetic field in the space and materials surrounding second transceiver 312. This near-field magnetic field induces a current in first transceiver 311, and can be used to transfer power from second transceiver 312 to first transceiver 311 over wireless link 330. Also in this example, the amount of power transferred is sufficient to power not only the circuitry in first transceiver 311 and user interface system 340, but also indicator 342. It should be understood that operations 410-413 could occur while operations 401-408 occur.

Monitor 343 monitors (411) a performance factor of first transceiver 311. The performance factor could include performance information related to power transfer over the wireless link between second transceiver 312 and first transceiver 311, or the power received by first transceiver 311. For example, the coil 311C of first transceiver 311 could be coupled to circuitry to convert currents induced in coil 311C to corresponding voltages, and the performance factor could include a voltage related to the current induced in first transceiver 311 by the near-field magnetic field produced by second transceiver 312.

Monitor 343 processes (412) the performance factor to determine when a power transfer problem exists between second transceiver 312 and first transceiver 311. The power transfer problem could indicate where transfer of the input power from second transceiver 312 to first transceiver 311 is degraded, where increased losses exist, or other problems in the transfer of power between second transceiver 312 and first transceiver 311. Monitor 343 processes the performance factor, which could include electrical parameters or other information related to power transfer, to determine when the performance factor degrades sufficiently to indicate a power transfer problem exists. In this example, a low voltage threshold is employed to determine when a power transfer problem exists. When a voltage associated with power transfer in first transceiver 311 decreases below the low voltage threshold, monitor 343 determines that a power transfer problem exists. It should be understood that the voltage could include a sinusoidal, modulated, or alternating voltage level, and the voltage threshold could represent a RMS value, ripple voltage, average value, direct current (DC) level, filtered representation, or other metrics for determining an associated threshold for a variable voltage. The voltage or current could be measured at circuit elements associated with first transceiver 311 or monitor 343, such as capacitors, resistors, inductors, semiconductor devices, amplifiers, buffers, or other circuit elements. Additionally, hysteresis could be employed on the threshold to prevent false triggers or mitigate frequent threshold crossings. In examples where first transceiver 311 receives both power and communications from second transceiver 312 over wireless link 330, the performance factor could include performance information related to communication transfer over wireless link 330 between second transceiver 312 and first transceiver 311, or communications received by first transceiver 311. For example, the performance factor could include a communication error rate, communication transfer rate, or other communication performance indicator between second transceiver 312 and first transceiver 311.

Monitor 343 transfers (413) an alert in response to the power transfer problem. In this example, monitor 343 transfers the alert to first transceiver 311 over link 321, where first transceiver 311 then wirelessly transfers the alert to second transceiver 312. In other examples, monitor 343 transfers the alert to user interface 341, and user interface 341 indicates the alert to a user of user interface system 340, such as by illuminating indicator 342 in response to the alert.

User interface system 340 also receives (401) user input via user interface 341. The user input, in typical examples, results from a user interacting with user interface 341. In this example, user interface system 340 includes a push button user interface 341, thus the user input could be a physical push or release of the push button.

First transceiver 311 receives (402) communications from user interface system 340 over link 321. The communications could result from a user interacting with user interface 341. In this example, user interface system 340 includes a push button user interface 341, thus the communications could reflect the state of the push button, among other information. Monitor 343 could interpret or alter the user input received from user interface 341 before transferring to first transceiver 311 over link 321.

First transceiver 311 transfers (403) the communications over wireless link 330. In this example, first transceiver 311 creates a near-field magnetic field in the space and materials surrounding first transceiver 311. The near-field magnetic field could be modulated to transfer the communications received from user interface system 340, or other forms of information transfer or wireless protocols could be employed.

Second transceiver 312 receives (404) the communications from first transceiver over wireless link 330. In this example, a near-field magnetic field produced by first transceiver 311 induces a corresponding current in second transceiver 312, and can be used to transfer communications from first transceiver 311 to second transceiver 312 over wireless link 330.

Second transceiver 312 then transfers (405) the communications to control a process implemented by a machine system, such as machine system 314. In this example, the communications transferred from second transceiver 312 are received by control device 313 over link 322. Control device 313 could further interpret or modify the communications format or protocol to enable further transfer of the communications to machine system 314. In some examples, control device 313 includes circuitry and equipment to interpret the communications received from second transceiver 312 to drive a relay circuit or switching circuit which could control machine system 314 over link 323. In other examples, the communications received from second transceiver 312 could be amplified, isolated, or passed through protection circuitry in control device 313 to facilitate control of high-current or hazardous environment equipment in machine system 314. Machine system 314 could then implement the communications to enact a physical action in some form of machinery, engage a mechanism, move an actuator, or other response, including both physical and logical actions.

It should be understood that the communications transferred over wireless link 330 could be of a different form than that transferred from user interface system 340 or to machine system 314. For example, a first communication protocol could be used to transfer communications from user interface device 410 over link 321, a second communication protocol employed over wireless link 330, and other communication protocols employed over links 322-323.

Second transceiver 312 transfers (406) information relating to the state of a process implemented in machine system 314 over wireless link 330. The machine system implementing the process of machine system 314 could provide feedback to user interface system 340. For example, control system 313 could monitor the state of a process implemented in machine system 314, or machine system 314 could provide the information. Control device 313 could then transfer the information related to the state of the process implemented in machine system 314 over link 322. Second transceiver 312 could then receive this information and transfer (406) the state of the process implemented in machine system 314 over wireless link 330. Second transceiver 312 could transfer this information over wireless link 330 in a similar manner as first transceiver 311 transfers communications in operation 403, or other methods could be employed.

First transceiver 311 receives (407) the information related to the state of the process implemented in machine system 314 over wireless link 330. First transceiver 311 could then transfer the information over link 321 to user interface system 340.

User interface system 340 then lights (408) indicator 342 according to the information related to the state of the process implemented in machine system 314. Examples of the state of the process implemented in machine system 314 include a start of a process, an error condition, an engagement of a mechanism, a stoppage of a machine, a speed of a process, or other states.

Figure 5:
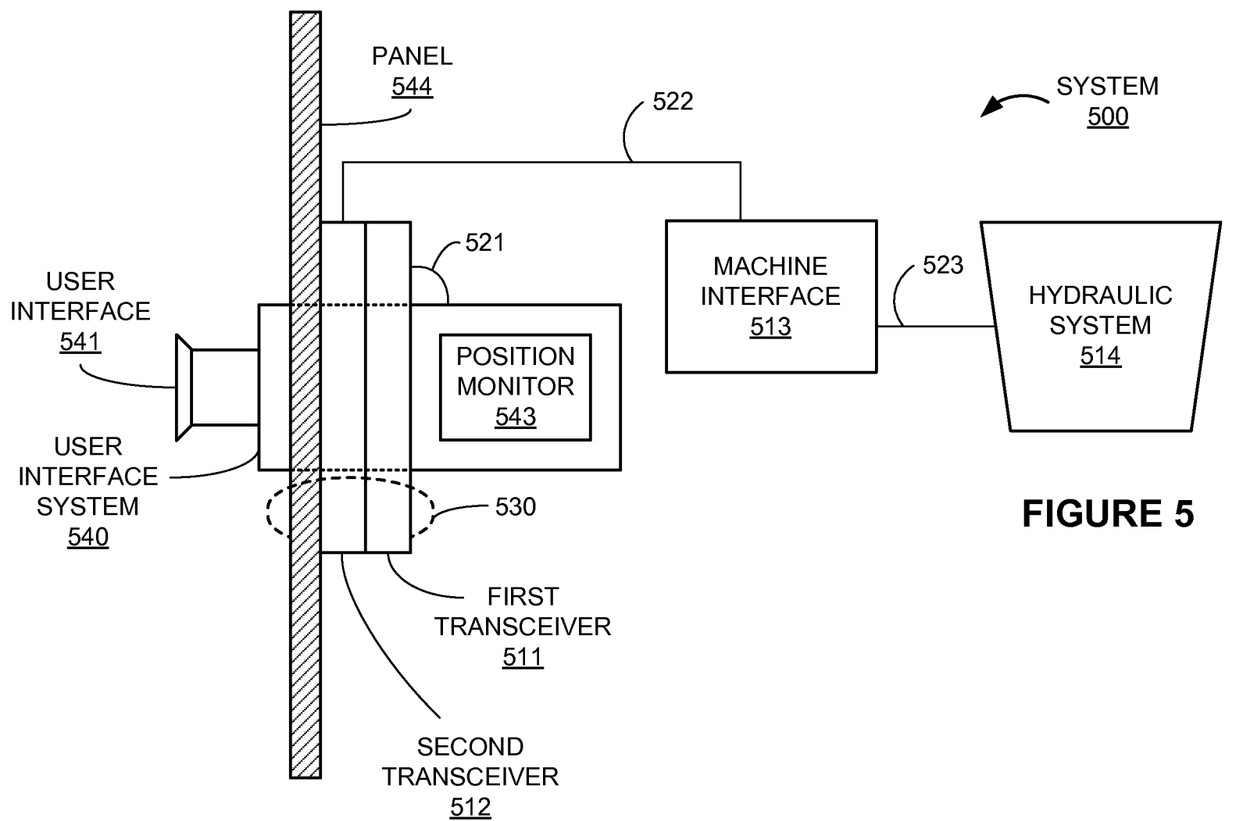
FIG. 5 is a block diagram illustrating a user interface system.

FIG. 5 is a system diagram illustrating system 500 for controlling a process implemented by hydraulic system 514. System 500 includes user interface system 540, first transceiver 511, second transceiver 512, panel 544, machine interface 513, and hydraulic system 514. User interface system 540 includes user interface 541 and position monitor 543.

User interface system 540 and first transceiver 511 communicate over link 521. First transceiver 511 and second transceiver 512 communicate over wireless link 530. Second transceiver 512 and machine interface 513 communicate over link 522. Machine interface 513 and hydraulic system 514 communicate over link 523.

User interface system 540 includes user interface 541, which in this example is a pushbutton. User interface system 540 also includes position monitor 543, and associated circuitry, to detect the position of the push button of user interface 541. In this example, position monitor 543 includes a magnetic sensor device, where non-contact sensing occurs between a magnetic field source coupled to the push button and a generally stationary magnetic sensor to detect when the push button of user interface 541 has been pushed or released. The magnetic sensor device could include a reed switch, hall-effect sensor, or other device. In other examples, position monitor 543 includes an accelerometer, pressure sensor, or other sensor, to detect the push or release of the push button of user interface 541. Position monitor 543 receives the user input information from user interface 541 and transfers the user input information to first transceiver 511 over link 521 for delivery over wireless link 530. In other examples, position monitor 543 receives information related to the state of hydraulic system 514 from first transceiver 511 and transfers the information to user interface 541. Position monitor 543 could modify or alter the user input information or machine state information before further transfer. Also, in typical examples, position monitor 543 is coupled to user interface system 540 and configured to receive operating power from first transceiver 511 or other circuitry in user interface system 540.

Also in this example, position monitor 543 monitors performance of power transfer and communication exchange over wireless link 530 and link 521. Position monitor 543 could include equipment and systems as described for processing system 113, although other configurations could be employed. Position monitor 543 monitors a performance factor of the power received over wireless link 530 and link 521. The performance factor in this example includes electrical parameters related to the transfer of power over wireless link 530, such as a voltage or current related to the power transfer, and the electrical parameters are processed by position monitor 543 to determine when a power transfer problem exists. When a power transfer problem exists, position monitor 543 transfers an alert to machine interface 513. In some examples the alert is transferred over link 521 for delivery to machine interface 513 over wireless link 530 and second transceiver 512.

First transceiver 511 includes circuitry to induce a magnetic field in the air, space, or material environment of first transceiver 511. First transceiver 511 also includes circuitry to detect and receive magnetic fields from the air, space, or material environment of first transceiver 511. In this example, first transceiver 511 is tuned to be sensitive to near-field magnetic fields and includes an electrically conductive coil formed as a printed circuit on a printed circuit board (PCB) assembly. Also, as illustrated in FIG. 5, first transceiver 511 is coupled to user interface system 540 to form an assembly, where user interface system 540 is disposed inside of first transceiver 511 by being inserted longitudinally through a center hole of the coil of first transceiver 511, and aligned generally along the axis of first transceiver 511. User interface system 540 passes through the middle portion of the coil of first transceiver 511, so that first transceiver 511 could be mounted to surround user interface system 540.

Second transceiver 512 includes circuitry to induce a magnetic field in the air, space, or material environment of second transceiver 512. In this example, second transceiver 512 is tuned to be sensitive to near-field magnetic fields and includes an electrically conductive coil formed as a printed circuit on a printed circuit board (PCB) assembly. Also, as illustrated in FIG. 5, second transceiver 512 is coupled to panel 544 to form an assembly, where second transceiver 512 and panel 544 would have generally aligning holes cut therethrough, so as to have the holes generally aligned with the center axis of the coil of second transceiver 512.

As shown in the example in FIG. 5, the assembly formed by first transceiver 511 and user interface system 540 is removably disposed inside the assembly formed by panel 544 and second transceiver 512 by being mounted through the hole cut through the assembly formed by panel 544 and second transceiver 512.

Machine interface 513 includes equipment and circuitry to transfer power to second transceiver 512 over link 522, as well as exchange communications with second transceiver 512 over link 522. Examples of machine interface 513 include amplifiers, filters, switches, solid-state electronics, microprocessors, antennas, or other circuitry. Machine interface 513 transfers control information to hydraulic system 514 over link 523, and could receive information related to the state of the hydraulic system operation implemented by hydraulic system 514 over link 523. Machine interface 513 could communicate with further systems and equipment over communication interfaces such as DeviceLogix, radio-frequency identification (RFID), controller-area network (CAN), wireless fidelity (WiFi), infrared data association (IrDA), or other communication interfaces—including combinations, improvements, or variations thereof.

Wireless link 530 is shown in FIG. 5 as being comprised of magnetic field lines, as illustrated by the dashed line passing through first transceiver 511 and second transceiver 512. Wireless link 530 uses various communication media, such as air, space, material, or some other wireless transport media—including combinations thereof. In this example, wireless link 530 includes a magnetic field induced by the coil of first transceiver 511 in the surroundings of first transceiver 511. Second transceiver 512 could detect and receive the magnetic field energy induced by first transceiver 511. Wireless link 530 also includes a magnetic field induced by a coil of second transceiver 512 in the surroundings of second transceiver 512. First transceiver 511 could detect and receive the magnetic field energy induced by second transceiver 512. In further examples, first transceiver 511 could transfer communications over wireless link 530 by increasing a load or power draw in a modulated fashion, and second transceiver 512 detects the modulated power draw and processes the modulation to determine the communications transferred by first transceiver 511.

In this example, first transceiver 511 and second transceiver 512 are located in close proximity to each other to advantageously receive a larger portion of the magnetic energy induced to form wireless link 530. In this example, wireless link 530 is a near-field magnetic link. It should be understood that the magnetic field lines illustrated by the dashed lines in wireless link 530 of FIG. 5 are merely representative of wireless link 530 to show magnetic fields generated by one transceiver are able to be received at another transceiver.

Advantageously, an assembly which includes both user interface system 540 and first transceiver 511 could be made easily removable from an assembly incorporating second transceiver 512 and panel 544 to not only allow for close proximity of first transceiver 511 and second transceiver 512, but also improved ease of assembly and maintenance. Also, quick insertion and removal of the assembly incorporating user interface system 540 and first transceiver 511 from the assembly incorporating second transceiver 512 and panel 544 could be achieved without the need to connect or disconnect a wired interface. Furthermore, position sensor 543 monitors a performance factor of power transfer over wireless link 530 and can aid in assembly and maintenance by altering when a power transfer problems exists.

Furthermore, panel 544 could include an array of many user interface devices, each implementing a different user interface function, along with associated transceivers, to allow for a control panel which includes controls for several processes implemented by machine systems. In examples with an array of many interface devices, system 500 could also assure the proper user interface type is inserted into the appropriate control panel location to aid in construction and repair of the control panel array assembly. Also, since a direct wire interface is not utilized between user interface system 540 and machine interface 513, reconfiguration of the varying functions of each user interface device in an array of many user interface devices could be achieved without re-wiring. The alert transferred by position sensor 543 could indicate a mis-wiring arrangement of user interface system 540.

In further examples, user interface system 540 or first transceiver 511 could be programmed with information describing the transceiver or associated user interface. For example, the information could include a function description of the user interface, a series or model designator, an installation date, maintenance date, a number of uses or activations of the user device, a time of last successful communication with another transceiver, or other information, including combinations thereof. First transceiver 511 could transfer the information in response to a request from another system, such as by second transceiver 512 or machine interface 513. In other examples, many user interface systems could be arrayed on a control panel. The many user interface systems could share a common communication bus or elements of a common transceiver for communication and power transfer. In examples of a common communication bus, a time-wise multiplexing or addressability could be employed to communicate with each user interface system or user interface device individually. In examples of addressability, many protocols could be employed, such as Internet protocol (IP), Ethernet, controller-area network (CAN), or other protocols.

Figure 6:
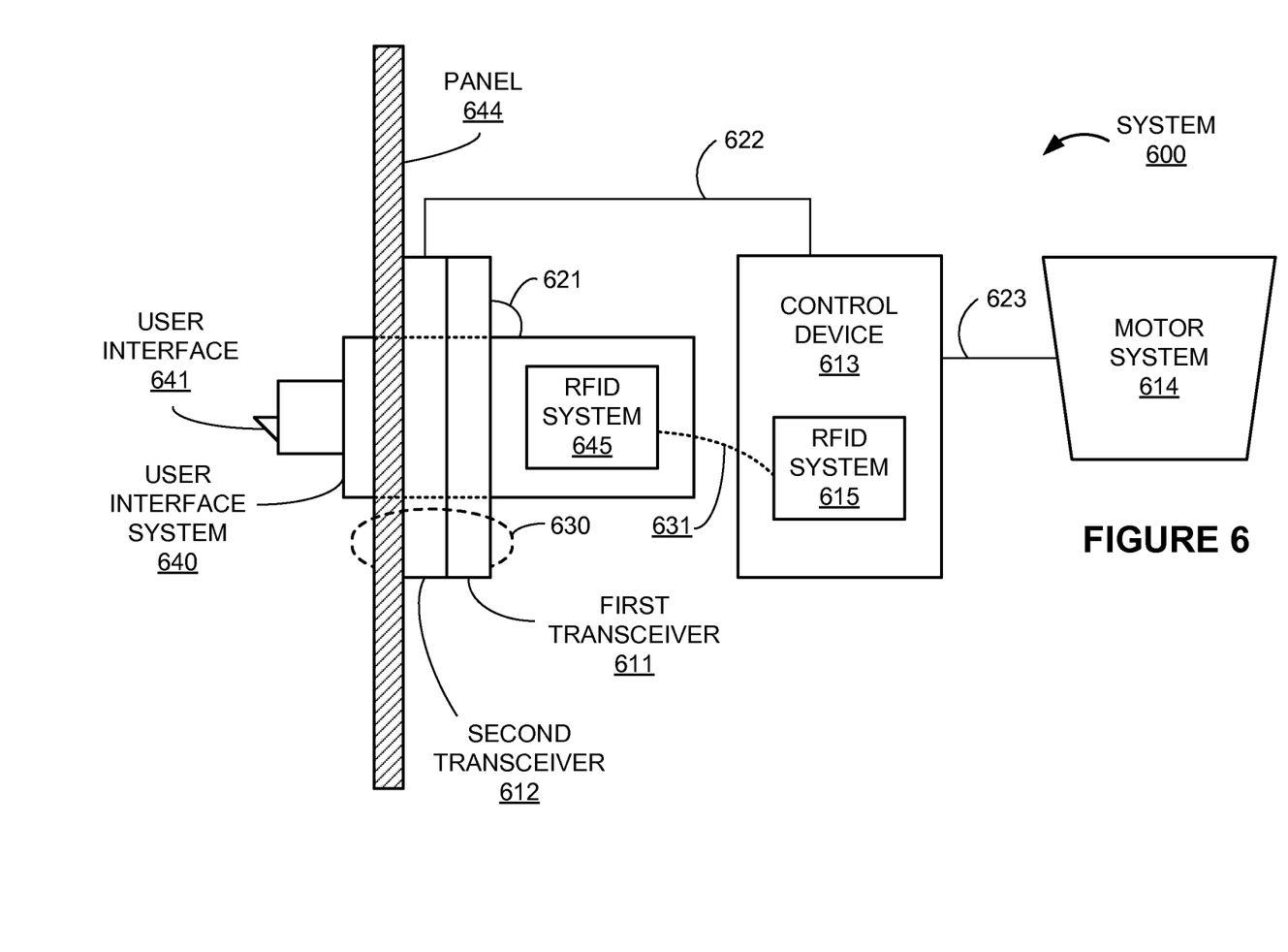
FIG. 6 is a block diagram illustrating a user interface system.

FIG. 6 is a system diagram illustrating system 600 for controlling a process implemented by motor system 614. System 600 includes user interface system 640, first transceiver 611, second transceiver 612, panel 644, control device 613, and motor system 614. User interface system 640 includes user interface 641 and radio-frequency identification (RFID) system 645. Control device 613 includes RFID system 615.

User interface system 640 and first transceiver 611 communicate over link 621. First transceiver 611 and second transceiver 612 communicate over wireless link 630. Second transceiver 612 and control device 613 communicate over link 622. Machine interface 613 and motor system 614 communicate over link 623. RFID system 645 and RFID system 615 communicate over wireless link 631.

User interface system 640 includes user interface 641, which in this example is a rotary switch. User interface system 640 receives operational power from first transceiver 611 over link 621. User interface system 640 also includes RFID system 645, and associated circuitry, to wirelessly transfer an indicator of the position of the rotary switch of user interface 641. Also in this example, RFID system 645 monitors performance of power transfer over wireless link 630 and link 621, as well as communication exchange over wireless link 631. RFID system 645 could include equipment and systems as described for processing system 113, although other configurations could be employed. RFID system 645 could modify or alter the user input information or machine state information before further transfer.

First transceiver 611 includes circuitry to detect and receive magnetic fields from the air, space, or material environment of first transceiver 611. In this example, first transceiver 611 is tuned to be sensitive to near-field magnetic fields and includes an electrically conductive coil formed as a printed circuit on a printed circuit board (PCB) assembly. Also, as illustrated in FIG. 6, first transceiver 611 is coupled to user interface system 640 to form an assembly, where user interface system 640 is inserted longitudinally through the center of the coil of first transceiver 611, and aligned generally along the axis of first transceiver 611. User interface system 640 passes through the middle portion of the coil of first transceiver 611, so that first transceiver 611 could be mounted to surround user interface system 640. In some examples, at least a portion of the circuitry of user interface system 640 is formed on the PCB onto which first transceiver 611 is formed.

Second transceiver 612 includes circuitry to induce a magnetic field in the air, space, or material environment of second transceiver 612. In this example, second transceiver 612 is tuned to be sensitive to near-field magnetic fields and includes an electrically conductive coil formed as a printed circuit on a printed circuit board (PCB) assembly. Also, as illustrated in FIG. 6, second transceiver 612 is coupled to panel 644 to form an assembly, where second transceiver 612 and panel 644 would have generally aligning holes cut therethrough, so as to have the holes generally aligned with the center axis of the coil of second transceiver 612.

As shown in the example in FIG. 6, the assembly formed by first transceiver 611 and user interface system 640 is removably mounted through the hole cut through the assembly formed by panel 644 and second transceiver 612.

Control device 613 includes equipment and circuitry to transfer power to second transceiver 612 over link 622, as well as exchange communications with RFID system 645 through RFID system 615. Examples of control device 613 include amplifiers, filters, switches, solid-state electronics, microprocessors, antennas, or other circuitry. Control device 613 transfers control information to motor system 614 over link 623, and could receive information related to the state of the motor operation implemented by motor system 614 over link 623. Control device 613 could communicate with further systems and equipment over communication interfaces such as DeviceLogix, controller-area network (CAN), wireless fidelity (WiFi), infrared data association (IrDA), or other communication interfaces—including combinations, improvements, or variations thereof. In some examples, at least a portion of the circuitry of control device 613 is formed on the PCB onto which second transceiver 612 is formed.

RFID system 645 includes circuitry such as RFID tags, antennas, transceivers, identification circuitry, computer-readable storage media, or other circuitry. RFID system 645 also receives communications related to the state of user interface 641, and transfers the information over wireless link 631. In some examples, RFID system 645 is coupled to user interface system 640 and configured to wirelessly transfer communications over wireless link 631 to control the process implemented by motor system 614. Also, in some examples, a wireless portion of RFID system 645 receives power wirelessly from RFID system 615, and a monitoring portion of RFID system 645 receives power from user interface system 640 or over link 621 from first transceiver 611.

RFID system 645 also monitors a performance factor of the power transfer over wireless link 630. The performance factor in this example includes a positional parameter related to a spacing relationship between first transceiver 611 and second transceiver 612. If the spacing between first transceiver 611 and second transceiver 612 increases past a threshold, such as when first transceiver 611 becomes physically distant from second transceiver 612, the performance factor indicates a power transfer problem. In some examples, additional sensors or monitors could be included in user interface system 640 to determine a physical spacing, such as optical or magnetic proximity sensors. In other examples, electrical parameters related to a physical distance or rotational orientation between first transceiver 611 and second transceiver 612 are monitored, such as a phase angle relationship between voltages or currents associated with the power transfer over wireless link 630. In further examples, a voltage level could be related to a separation distance between first transceiver 611 and second transceiver 612. The electrical parameters are processed by RFID system 645 to determine when a power transfer problem exists. When a power transfer problem exists, RFID system 645 transfers an alert to control device 613. In some examples the alert is transferred over wireless link 631 to RFID system 615. In other examples, the alert is transferred for delivery to control device 613 over wireless link 630 to second transceiver 612.

RFID system 615 includes circuitry such as RFID readers, antennas, transceivers, or other circuitry. RFID system 615 transfers electromagnetic energy over wireless link 631 and receives communications related to the state of user interface 641 over wireless link 631. The communications could then be used to control the process implemented by a machine system, or motor system 614, in this example.

Wireless link 630 is shown in FIG. 6 as being comprised of magnetic field lines, as illustrated by the dashed line passing through first transceiver 611 and second transceiver 612. Wireless link 630 uses various communication media, such as air, space, material, or some other wireless transport media—including combinations thereof. In this example, wireless link 630 includes a magnetic field induced by a coil of second transceiver 612 in the surroundings of second transceiver 612. First transceiver 611 could detect and receive the magnetic field energy induced by second transceiver 612.

In this example, first transceiver 611 and second transceiver 612 are located in close proximity to each other to advantageously receive a larger portion of the magnetic energy induced to form wireless link 630. In this example, wireless link 630 is a near-field magnetic link. It should be understood that the magnetic field lines illustrated by the dashed lines in wireless link 630 of FIG. 6 are merely representative of wireless link 630 to show magnetic fields generated by one transceiver are able to be received at another transceiver.

Wireless link 631 is an RFID wireless link in this example. Wireless link 631 uses various communication media, such as air, space, or some other wireless transport media—including combinations thereof. Wireless link 631 is used to transfer communications to control a process implemented by a machine system from user interface system 640 to control device 613. In further examples, wireless link 631 is also used to transfer information related to a state of a process implemented by a machine system to user interface system 640 from control device 613. In addition to the communications transferred over wireless link 631, power could be wirelessly transferred to provide power to wireless portions of RFID system 615 or 645. It should be noted that the power transfer over wireless link 631 would typically be far-field, radiated electromagnetic energy, and different from the near-field, induced electromagnetic energy or magnetic field coupling of wireless link 630.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless push button device, comprising:
   a user interface configured to receive user input to control a process of a machine system;
   a first transceiver coupled to the user interface and configured to wirelessly receive input power from a second transceiver, provide user power to the user interface, and wirelessly transfer communications related to the user input to the second transceiver; and
   a processing system configured to determine when a power transfer problem exists between the second transceiver and the first transceiver, and transfer an alert in response to the power transfer problem.

2. The wireless push button device of claim 1, wherein the second transceiver is configured to wirelessly transfer the input power to the first transceiver and wirelessly receive the communications related to the user input from the first transceiver.

3. The wireless push button device of claim 2,
   wherein the first transceiver is configured to induce a first current in the second transceiver by way of a first magnetic field and wirelessly transfer the communications over near-field energy of the first magnetic field; and
   wherein the second transceiver is configured to induce a second current in the first transceiver by way of a second magnetic field, wirelessly transfer the input power to the first transceiver over near-field energy of the second magnetic field, and wirelessly receive the communications from the first transceiver over the near-field energy of the first magnetic field.

4. The wireless push button device of claim 1, wherein the first transceiver and the second transceiver are not coupled by a transformer core.

5. The wireless push button device of claim 1, wherein the second transceiver is configured to wirelessly transfer information related to a state of the process implemented by the machine system to the first transceiver, and wherein the first transceiver is configured to transfer the information related to the state of the process implemented by the machine system to the user interface.

6. The wireless push button device of claim 5, wherein the user interface is configured to light an indicator based on the information related to the state of the process implemented by the machine system.

7. The wireless push button device of claim 1, wherein the first transceiver and the second transceiver each comprise a transformer coil, and wherein the transformer coil of the first transceiver and the transformer coil the second transceiver are aligned along a same axis.

8. The wireless push button device of claim 7, wherein the user interface is mounted internally to and longitudinally along the same axis of the transformer coil of the first transceiver and the transformer coil of the second transceiver.

9. The wireless push button device of claim 1, further comprising:
a radio-frequency identification (RFID) circuit coupled to the user interface and configured to receive the user power from the first transceiver and wirelessly transfer communications to control the process implemented by the machine system.

10. The wireless push button device of claim 1, wherein the performance factor of the first transceiver comprises a voltage associated with the input power received from the second transceiver.

11. A method for operating a wireless push button device, the method comprising:
in a user interface, receiving user input to control a process of a machine system;
in a first transceiver coupled to the user interface, wirelessly receiving input power from a second transceiver, providing user power to the user interface, and wirelessly transferring communications related to the user input to the second transceiver; and
in a processing system, determining when a power transfer problem exists between the second transceiver and the first transceiver, and transferring an alert in response to the power transfer problem.

12. The method of claim 11, further comprising:
in the second transceiver, wirelessly transferring the input power to the first transceiver and wirelessly receiving the communications related to the user input from the first transceiver.

13. The method of claim 12, further comprising:
in the first transceiver, inducing a first current in the second transceiver by way of a first magnetic field and wirelessly transferring the communications over near-field energy of the first magnetic field; and
in the second transceiver, inducing a second current in the first transceiver by way of a second magnetic field, wirelessly transferring the input power to the first transceiver over near-field energy of the second magnetic field, and wirelessly receiving the communications from the first transceiver over the near-field energy of the first magnetic field.

14. The method of claim 11, wherein the first transceiver and the second transceiver are not coupled by a transformer core.

15. The method of claim 11, further comprising:
in the second transceiver, wirelessly transferring information related to a state of the process implemented by the machine system to the first transceiver; and
in the first transceiver, transferring the information related to the state of the process implemented by the machine system to the user interface.

16. The method of claim 15, further comprising:
in the user interface, lighting an indicator based on the information related to the state of the process implemented by the machine system.

17. The method of claim 11, wherein the first transceiver and the second transceiver each comprise a transformer coil, and wherein the transformer coil of the first transceiver and the transformer coil the second transceiver are aligned along a same axis.

18. The method of claim 17, wherein the user interface is mounted internally to and longitudinally along the same axis of the transformer coil of the first transceiver and the transformer coil of the second transceiver.

19. The method of claim 11, further comprising:
in a radio-frequency identification (RFID) circuit coupled to the user interface, receiving the user power from the first transceiver and wirelessly transferring communications to control the process implemented by the machine system.

20. The method of claim 11, wherein the performance factor of the first transceiver comprises a voltage associated with the input power received from the second transceiver.

* * * * *